Dec. 29, 1931.   J. CALLING   1,838,360
COTTON PICKER SPINDLE
Filed May 12, 1930
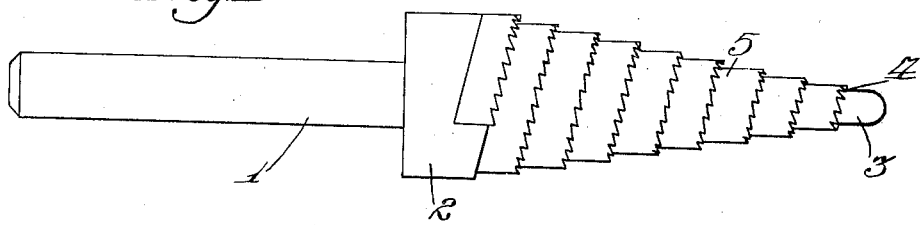
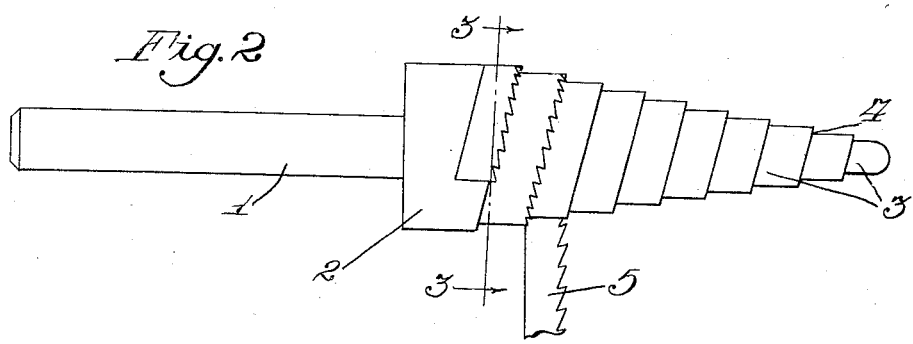
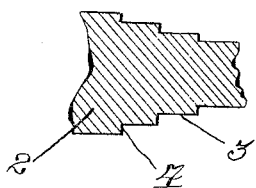
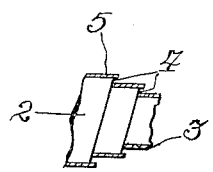
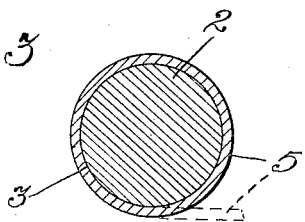
Inventor:
John Calling
By N.P. Doolittle
Atty.

Patented Dec. 29, 1931

1,838,360

UNITED STATES PATENT OFFICE

JOHN CALLING, OF CHICAGO, ILLINOIS, ASSIGNOR TO INTERNATIONAL HARVESTER COMPANY, A CORPORATION OF NEW JERSEY

COTTON PICKER SPINDLE

Application filed May 12, 1930. Serial No. 451,557.

The invention herein disclosed relates to cotton picking spindles of the rotatable type adapted for use in conjunction with suitable driving mechanism and transport means for picking cotton during travel in the field.

The main objects of the invention are to facilitate the manufacture of spindles of the short cone-shaped type having picking teeth extending on lines which are concentric with the axis of the spindle, while retaining the advantages of aggressive picking efficiency and ease of stripping possessed by spindles such, for instance, as shown and claimed in a co-pending application Serial No. 451,570, filed May 12, 1930.

The objects stated are attained by providing a novel body structure including a pre-formed picking element wound on and secured to the surface of the spindle as hereinafter more specifically described, and illustrated on the accompanying drawings where:

Figure 1 is a side view of a complete spindle embodying the invention;

Figure 2 is a similar view showing the manner of assembling the spindle elements;

Figure 3 is a cross-section on the line 3—3 of Figure 2;

Figure 4 is a partial longitudinal section of the base piece or body of the spindle; and, Figure 5 is a similar section after assembly.

In the present instance the invention is disclosed as a spindle structure comprising a central stem portion 1, and a body 2 which constitutes a base piece or support for the fiber engaging means combined therewith, as will be described.

The body 2 is preferably cone-shaped and is formed to provide a stepped spiral surface presenting a ribbon-like portion 3 extending from base to apex and which is preferably concentric to the axis of the spindle. The successive turns of the surface 3 are separated by an undercut angular shoulder 4. It has heretofore been the practice to grind or cut the picking teeth in the shoulder 4. This, while producing an efficient spindle, involves certain manufacturing difficulties, and, to obviate these, there is provided a separately formed, elongated fiber engaging element 5 herein shown as a metallic band having angular teeth cut in one edge and resembling a band saw. This toothed element or band is wound or mounted on the spiral surface 3 with its toothed edge projecting beyond the shoulder 4 and is secured in position as by spot welding at each end.

This construction provides a composite spindle having picking teeth extending on lines concentric to the spindle axis offering no resistance to stripping or doffing of collected cotton towards the apex of the spindle body.

There is thus provided a spindle structure embodying the broad idea of separate manufacture of the fiber engaging element and assembly thereof with the base piece to form the complete spindle and, while the preferred form of the invention is shown, its scope is limited only by the following claims.

What is claimed is:

1. A cotton picking spindle comprising a cone-shaped base piece formed with a circumferentially stepped surface and a separately formed toothed band surrounding the base piece and secured to the stepped surface with the width of the band extending axially of the base piece.

2. A cotton picking spindle comprising a cone-shaped base piece formed with a circumferentially stepped surface and an elongated band wound on and secured to the stepped surface with its surface concentric to the axis of the base piece and one edge projecting beyond the step, and fiber engaging teeth formed on said edge of the band.

3. A cotton picking spindle comprising a cone-shaped base piece formed with a spirally extending seat, and an elongated fiber engaging element mounted on said seat.

4. A cotton picking spindle comprising a cone-shaped base piece formed with a spirally extending stepped surface disposed concentrically to the axis of the base piece, and a toothed band mounted on said spiral surface.

5. A cotton picking spindle comprising a cone-shaped base piece formed with a spirally extending stepped surface disposed concentrically to the axis of the base piece, and a band formed with teeth on one edge wound on said surface with the teeth on the band projecting over the edge of the step.

In testimony whereof I affix my signature.

JOHN CALLING.